United States Patent [19]

Schwiers et al.

[11] 4,406,855
[45] Sep. 27, 1983

[54] LEAK DETECTION INSTALLATION

[75] Inventors: Hans-Georg Schwiers, Ketsch; Josef Schoening, Hambruecken; Guenter Kissling, Hemsbach, all of Fed. Rep. of Germany

[73] Assignee: Hochtemperatur-Reaktorbau GmbH, Cologne, Fed. Rep. of Germany

[21] Appl. No.: 153,527

[22] Filed: May 27, 1980

[30] Foreign Application Priority Data

May 29, 1979 [DE] Fed. Rep. of Germany ....... 2921707

[51] Int. Cl.³ ............................................. G21C 17/00
[52] U.S. Cl. .................................................... 376/250
[58] Field of Search .................. 176/19 LD; 340/605; 73/40 R, 40.5 R; 376/250

[56] References Cited

U.S. PATENT DOCUMENTS

| | | | |
|---|---|---|---|
| 2,679,747 | 6/1954 | Andrus | 73/40 |
| 3,995,472 | 12/1976 | Murray | 340/605 |
| 4,002,055 | 1/1977 | Kops | 73/40 |

FOREIGN PATENT DOCUMENTS

| | | | |
|---|---|---|---|
| 524682 | 5/1956 | Canada | 340/605 |
| 1287677 | 9/1972 | United Kingdom | 176/19 LD |
| 1373105 | 11/1974 | United Kingdom | 176/19 LD |
| 1412516 | 11/1975 | United Kingdom | 176/19 LD |

*Primary Examiner*—Sal Cangialosi
*Attorney, Agent, or Firm*—Schwartz, Jeffery, Schwaab, Mack, Blumenthal & Koch

[57] ABSTRACT

The leakage of gases in gas cooled nuclear reactors is detected by an arrangement utilizing a flexible material to cover areas of potential leakage and create detection cavities inside the concrete vessel of a nuclear power plant. The detection cavities are connected to the gas collector housed within the concrete vessel by means of gas-tight connecting conduits or lines. A negative pressure is applied to the gas collection device connecting conduits and detection cavities to extract any gas leakage within the power plant. Gas measuring devices and display devices are included in the system to identify, quantify or locate gas leakage.

17 Claims, 9 Drawing Figures

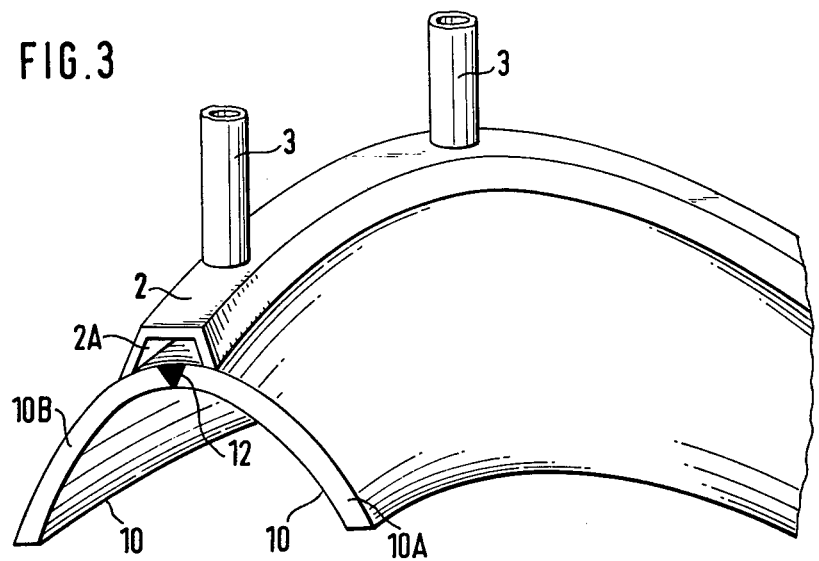
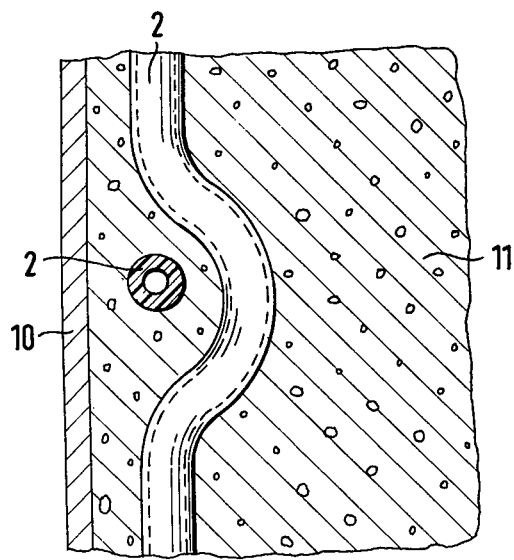

LEAK DETECTION INSTALLATION

BACKGROUND OF THE INVENTION

1. Field of the Invention

The invention relates to a leak detection device for the pressure vessel of a gas cooled nuclear reactor. Typically, reactors of this type utilize a single or double wall liner in cavities of a concrete pressure vessel. More particularly, the invention concerns an arrangement of detection spaces surrounding at least weak locations of the liner and conduits on the concrete side of the liner to receive the cooling gas escaping upon the occurrence of leakages. The detection spaces are connected for the conduction of the cooling gas with at least one gas collector equipped with an indicator by means of connecting lines.

2. Background of the Prior Art

Pressure vessels of concrete or reinforced concrete for nuclear reactors must be provided in most cases with a metal inner liner for the sealing of the vessel walls. Requirements concerning the properties of the material of the liner are very high. This is particularly true for liners of high temperature nuclear reactors, cooled by means of gas. In spite of the strict construction specifications, which also require proof of the durability of the pressure vessel in the event of a series of hypothetical failures, the possibility that in time leakages may occur, cannot be completely excluded.

To contain leakages of this type occurring in the area of the liner and the cooling gas lines one leak detection device is also known. This device comprises a tubing system arranged for the detection of leaks on the side of the concrete in the vicinity of the liner. Individual pipes are installed in the form of a quadratic area grid. Each pipe has at its connection point with another pipe a fitting extending directly to the rear side of the liner. This is achieved by providing each pipe at its free end with a sliding sleeve of a porous material. The porous material is pressed against the liner prior to cementing. This snuffing nozzle provides direct contact of the orifice cross-section of the pipe with the liner. The detection installation may be further expanded so that certain areas of the liner that appear to be especially susceptible to leakage can be given individual attention. Such locations are represented particularly by welds and the passages of fittings. To detect potential leakages in the area of the welded joints for example, a hollow detection space is formed on the side of the concrete. This detection space is formed by welding sheet metal to the liner. The detection cavity formed in this manner is connected by means of tubing with the above-mentioned leak detection system.

A disadvantage of this known leak detection installation is its cost. The particularly high costs result from the fact that the detection cavities are arranged around the welded joints. They must be prepared individually to adapt them to the existing external contours of the structural elements of the reactor. Subsequently, these shapes must be welded to the liner by skilled welders, which further adds to the cost.

A further leakage installation for a double walled liner is also known. This installation has a system of channels. The system is arranged between the insulating concrete placed between the two walls of the liner and serves as a means to dry out the concrete and provide thermal stabilization of the insulating concrete during the construction phase. During the operation of the reactor, the channels are utilized for leak detection. The channels are prepared by placing thin tubing, hose members or round shapes into the concrete during its batch pouring and subsequently pulling them out. With the combination of the double walled liner surrounding the insulating concrete and the enclosed channel system, all leakage can be safely drained off so that the eventual cracks that form in the reinforced concrete do not lead to a buildup of pressure. The preparation of the leakage channels in the insulating concrete is a disadvantage in itself. Particularly in locations where there are deviations from the straing line, vertical arrangement significant problems may be expected. In case of a multiple cavity design, the detection network with vertical and horizontal channels will result in a comparatively complex geometry.

Still another leak detection arrangement is known from West German Offenlegungsschrift No. 23 27 394 for a pressure vessel with a single wall liner. The arrangement comprises channels on the concrete side in the vicinity of the liner, closed at least at one of their ends. There are surrounded by capillaries opening into the channels. The open ends of the channels are combined into a group of channels connected with a pump. The installation of the capillaries formed by finely porous tubular lines, particularly in areas characterized by a complex geometry is disadvantageous.

SUMMARY OF THE INVENTION

It is, therefore, an object of the present invention to improve the adaptability of the detection cavities that are part of the liner detection installation to the geometry of the structural parts of the reactor, so as to facilitate the installation of the detection cavities.

The objects and advantages of the invention are attained in the leakage detection installation of the above-described type by making the detection cavities of a flexible foam material, by securing the detection cavities with an adhesive intermediate and by connecting the detection cavities to one or more gas collectors to the structural parts of the pressure vessel by way of gas tight connecting pipes.

In contrast to known leak detection arrangements or devices the detection cavities of the leak detection installation according to the present invention are not made of metal, but of a foam material. This material is a flexible material enabling the detection cavities to be adapted in a very simple manner to the existing geometry of the structural parts of the reactor. A particularly advantageous foam material for this purpose is a flexible styrene-based closed cell foam or expanded bead commercially available under the name Styropor.

Additionally, the flexible foam material may be fastened by means of an intermediate adhesive medium to metallic structural parts. Particularly advantageous is a single or two-component adhesive.

The detection cavities are preferably designed in the form of channels. The flexible foam material is preferably in the form of a continuous length of material which may be cut to the desired length. The detection cavities may be formed by an arrangement of the flexible foam material to fit the external contours of the structural elements of the reactor. It is, therefore, readily installed along parts of any configuration. The foam material used for the preparation of the channels has sufficient rigidity such that the walls of the channels are not compressed by the adjacent concrete and such that the cavities arranged around weak points of the liner and any conduits are preserved. Any circulating gas such as the hot or cold cooling gases escaping through potential leaks may be collected within these cavities. All of the detection cavities are connected by means of gas-tight conduits with at least one gas collector of the leak detection installation.

In one particularly advantageous embodiment, the channels may be filled or blocked at predetermined points with the flexible foam material, concrete or other suitable filling material. In such cases, the escaping gas is collected in the boundary layers between the Styropor and the concrete is conducted from there through the connector conduits to the gas collector.

With a double walled liner, for example, it is possible to provide tubular detection cavities within the insulating concrete. Such tubular detection cavities are arranged in the form of an area grid. The tubular detection cavities are designed in the form of hollow or solid shapes. In combination with the double walled liner, which borders the insulating concrete with the detection spaces both to the inside and the outside, all of the leakage may be drained off safely so that any possible cracks in the reinforced concrete do not result in a pressure buildup in the reinforced concrete. It may be assumed that no adhesion exists between the liner and the insulating concrete. Furthermore, the existance of a large, interconnected porous volume in the insulating concrete itself is taken into consideration.

Under these conditions, in case of the occurrence of liner damage, the paths of the passage of gas are adequately defined and the coarse localization of the damage to the liner is possible.

BRIEF DESCRIPTION OF THE DRAWINGS

The preferred embodiments of the invention shall be hereinafter explained by means of the drawings. The progress achievable through the invention is also demonstrated in the following.

In the drawings:

FIG. 3 depicts a reactor cavity liner with a detection cavity attached by adhesive bonding;

FIG. 9 shows a detection cavity arranged within concrete adjacent to a single wall liner.

DETAILED DESCRIPTION OF THE DRAWINGS

Figure 1:
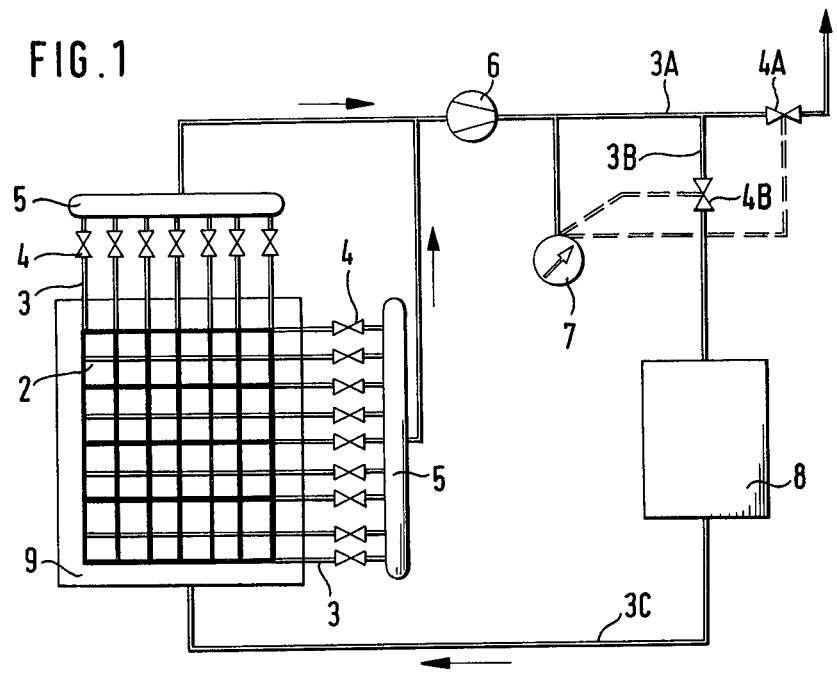
FIG. 1 shows a schematic representation of a leak detection installation.

The leak detection installation of the known type schematically shown in FIG. 1, comprises detection cavities 2, connecting tubes 3, 3A, 3B, 3C, closing elements 4, 4A, 4B, two gas collectors 5, a vacuum pump 6, a measuring and display device 7 and a helium purification installation 8.

The detection cavities 2 of the leak detection installation in FIG. 1 are installed on the side of the concrete within the schematically represented reactor pressure vessel 9 in the vicinity of the liner (not shown). This arrangement is for the collection of the gas escaping through leaks of the liner and the cooling lines.

The gas collected in the detection cavities 2 is conducted, by way of the connecting lines 3 connected with the detection cavities 2, to the gas collectors 5. The gas collectors 5 are interconnected with a vacuum pump 6, which produces a reduced pressure of a predetermined magnitude. During normal operation when there are no damaged locations in the liner, the reduced pressure merely acts to suction off the air collecting in the detection cavities 2, which is then released to the atmosphere by way of the gas collectors. The connecting line 3A, equipped with the closing element 4A is provided for the purpose. The gas collectors are further connected with the measuring and display device 7, which measures the volume or activity, respectively, of the helium leaked. In the event that a volume of gas that can no longer be tolerated is present in the gas collectors 5, the measuring instrument produces a control signal. This effects the closing of the closing element 4A, which is built into the line 3A which in turn is in communication with the atmosphere. Simultaneously, the control pulse acts to open the closing element 4B. The latter is inserted in the line 3B, which is branched off in front of the closing element 4A and connects to the gas collectors 5 with the gas purification installation 8. The latter communicates by means of a further connecting line 3C with the reactor pressure vessel 9. The gas suctioned from the leak detection cavities 2 passes by way of the gas collector 5 to the gas purification installation 8 and is then returned to the primary circuit.

With the aid of the leak detection installation the damaged location may be located on the liner of the reactor pressure vessel. This is effected by initially closing all of the detection cavities 2, which are connected by means of the connecting lines 3 with the gas collectors 5, with the closing elements 4. By opening the closing elements 4 only one at a time, the corresponding detection cavity may be examined with respect to its helium gas activity or content, respectively. By individually querrying the detection cavities, the individual corresponding concentrations will be indicated by the display device 7. It may be assumed that the detection cavities in the vicinity of a leak in the liner will display the highest measured concentration values because the helium concentration will be highest in the vicinity of a leak in the liner. By the horizontal and vertical arrangement of the detection cavities 2 in the form of a grid, as shown in FIG. 1, the position of a leak in the liner can be determined.

Figure 2:
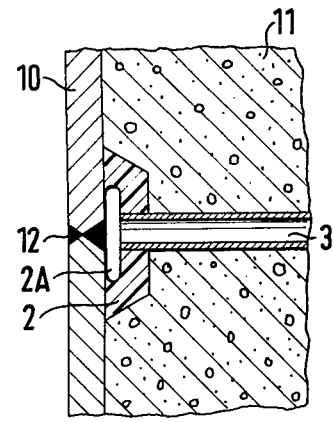
FIG. 2 represents a vertical section through a detection cavity.

FIG. 2 shows a vertical section through a pressure vessel. The pressure vessel is bounded on its outer surface by a concrete layer 11. Inwardly, the concrete layer 11 is joined to a liner. The latter consists in particular of a heavy metal skin, made of steel. The liner 10 is composed of a plurality of sheet metal panels, joined at their contact locations by welds 12. In order to immediately detect a fault in these welds 12, as mentioned hereinabove, a detection cavity 2 is arranged over each weld 12, on the side of the concrete.

The detection cavity 2 shown in FIG. 2, is in the form of a channel. It has a trapezoidal cross section. In particular, the bounding surfaces of all of the detection cavities are such that air bubbles generated for example during the concrete pouring process, cannot adhere. The internal area 2A of the detection cavities is hollow. The detection cavity 2, in the shape of a channel, is set on the liner with its open side, so that its internal open space is above the weld.

The channel-like structure of the detection cavity 2 is demonstrated in FIG. 3. Here, extremely curved partial surfaces 10A and 10B of the liner are again joined by a weld 12. Over the weld 12, as over the weld 12 in FIG. 2, a channel-shaped detection cavity 2 with a trapezoidal cross section is again arranged.

According to a preferred embodiment of the invention, the detection cavities 2 described hereinabove are made of Styropor. The wall thickness of the detection cavity 2 is such that the concrete layer 11 applied to the liner 10 cannot compress the detection cavity 2. The internal hollow space 2A must be fully preserved because it serves to collect the helium potentially seeping through the weld 12. Because the detection cavity 2 is made of Styropor, it may be adapted to areas with very strong curvatures, as seen in FIG. 3. By virtue of the ready flexibility of the foam material, the detection cavity may be placed over the welds of structural parts of any configuration. When using a detection cavity made of Styropor or another foam material with similar properties, it is thus not necessary to assemble the channel to be set over the weld foam individual partial profiles, in order to obtain a detection cavity with the curvatures required.

During installation the detection cavity 2 is arranged over the weld 12. To obtain a tight contact between the interface of the detection cavity 2 and the liner 10 and further to prevent the sliding of the channel during the application of the concrete layer 11 to the liner 10, an intermediate fastening means, for example, a single or two component adhesive, is applied to the contact locations to the liner and the detection cavity. This results in a firm connection over the entire length. Because, as mentioned herinabove, the material for forming the detection cavity 2 is produced in the form of cut goods, it is cut at both ends of the weld 12 to the same length and then sealed.

In order to conduct the gas collected in the detection cavity 2 to the gas collectors 5 of the leak detection installation shown in FIG. 1, the detection cavity 2 is connected in predetermined intervals by means of a tube 3 each, with the gas collector 5. As may be seen in FIG. 2, each connecting tube 3 is inserted from above through the flexible material wall into the cavity 2A in the detection cavity 2. This is particularly advantageous in the case of the detection cavities with trapezoidal cross sections. Each detection cavity may be provided with the corresponding passages during manufacturing or prior to the adhesive bonding operation with the liner 10.

Figure 4:
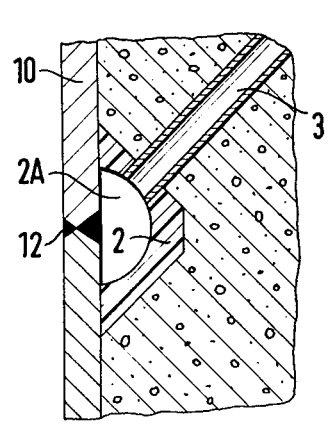
FIG. 4 demonstrates a vertical section through another detection cavity.

When the prevailing conditions require that the connecting tubes 3 be brought to the detection cavity from one side rather than from above, the form of embodiment of a detection cavity shown in FIG. 4 is preferable used. The detection cavity 2 shown therein in cross section is again in the shape of a channel. It again has an internal void 2A extending over the entire length of the channel.

This detection cavity is again open on one side and is placed onto the liner with this open side, so that again its inner void 2A is positioned over the weld 12 of the liner 10. The detection cavity has a triangular cross section, wherein the tip facing the concrete is flattened.

For the connection of the detection cavity 2 with the connecting tubes 3, appropriate passages are provided in one of the lateral surfaces bounding the channel. The connecting tubes 3 are inserted through these passages to the inner void 2A. The detection cavity shown in FIG. 4 is also made of Styropor or another foam material with suitable properties. The wall thickness of this detection cavity is again such that it is capable of absorbing forces originating in the concrete layer 11 applied to the liner 10.

Figure 5:
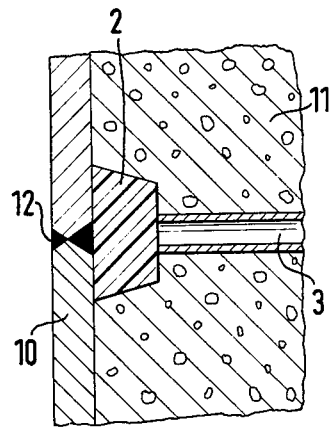
FIG. 5 shows a detection cavity completely filled with the flexible detection cavity forming material in a vertical cross section.

FIG. 5 shows yet another form of embodiment of a detection cavity, again in cross section. The detection cavity 2 is arranged here over a weld 12 of the liner 10 and has a trapezoidal cross section. In contrast to the detection cavities described in FIGS. 2 to 4, this cavity has no internal void. The device consists of a Styropor block extending over the entire length of the weld with the above-mentioned cross section. In the case of a hypothetical leak in the weld 12, the escaping gas is able to flow between the interfaces of the Styropor and the concrete because of the yielding of the foam material. To conduct the gas to the gas collector, at least one connecting tube 3 is extended to the contact surface of the detection cavity facing the weld 12. The helium collecting at this contct surface is suctioned off by the negative pressure in the connecting tube 3. The surface of the detection cavity 2 in contact with the liner 10 is fastened by means of an adhesive to the liner 10.

Figure 6:
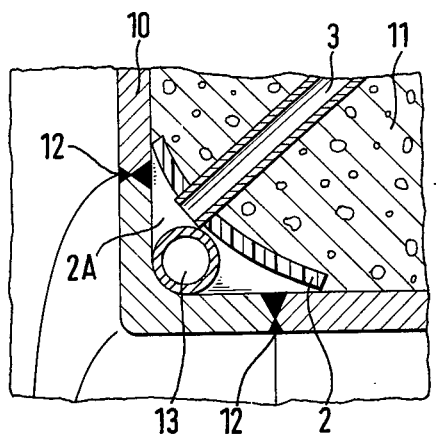
FIG. 6 represents a detection cavity formed by a flat piece of flexible material in a vertical section.

In FIG. 6 another detection cavity 2 is represented. This detection cavity shields simultaneously two welds 12 of the liner 10 and a cooling conduit 13 toward the concrete.

The partial surface of the liner 10 represented in FIG. 6 is bent at right angles, whereby the cooling conduit 13 is placed inside this angle. It is not necessary in this instance to shape the walls bordering the detection cavity 2 in any special manner. Because the two welds 12 are located on both sides of the cooling conduit 13, the wall forming the detection cavity 2 may consist of a flat piece of Styropor for example. This flat piece shields the welds 12 and the cooling conduit 13 against the concrete. A void 2A is formed around the welds 12 and the cooling line 13. The flat piece of Styropor is installed over the entire length of the welds 12 and the cooling conduit 13. Its contact surface resting against the liner 10 are fastened thereto in a firm manner by means of an adhesive. The flat piece of Styropor has a slight curvature directed toward the liner. In order to suction off the helium collecting in the void, at least one connecting tube 3 is provided. The latter is conducted through a passage in the flat piece of Styropor into the inner void 2A of the detection cavity.

All of the connecting tubes 3 leading from the detection cavities 2 to the gas collectors 5 are made of a gas-tight material, for example, a metal or a synthetic plastic. This is absolutely necessary so that the collected gas may be conducted to the collector and accurately measured, thus providing an indication of the volume of gas excapting and making possible the locating of the damaged section with the highest accuracy afforded by the leak detection installation.

Figure 7:
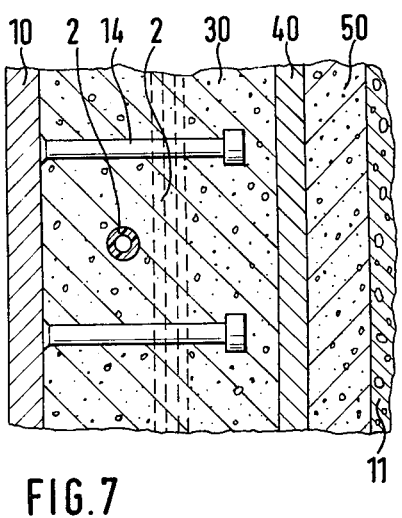
FIGS. 7 and 8 each depict a cross-section through a double walled liner wherein the detection cavities are arranged within the insulating concrete.

In FIG. 7, a vertical section through a reactor pressure vessel 9 with a double wall is shown. A layer of insulating concrete 20 is joined to the liner 10 serving as a seal. The concrete liner is bounded by a cooling surface 40, also designated as the second liner wall. A further insulating layer 50 follows the second liner wall, to which the concrete layer 11 is applied, representing the outer limiting surface of the reactor pressure vessel 9. The liner 10 is held by concrete anchors 14 inserted in the insulating concrete 30.

As mentioned hereinabove, it is sufficient for the collection of leakage gases within a double walled liner 5 to arrange detection cavities 2 in the form of a grid within the insulating concrete. FIG. 7 shows two of these detection cavities 2. They are designed in the form of channels, as are the other embodiments exemplified herein. They have cylindrical cross sections and traverse the insulating concrete in orthogonal directions over its entire area. The detection cavities shown in FIG. 7 are tubes made of Styropor comprising an internal void 2A. The helium cooling gas escaping into the insulating concrete may be removed by means of the system of detection cavities arranged within the insulating concrete.

Figure 8:
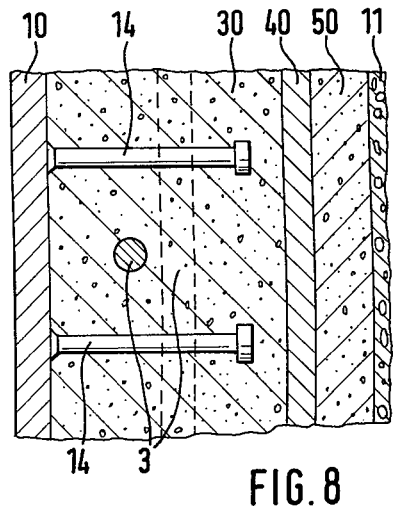

FIG. 8 shows the same section through the walls of a reactor pressure vessel with a double walled liner corresponding to the representation of FIG. 7. Within the insulating concrete 30, a system of detection cavities 2 is again arranged. These are channel-like detection cavities 2 with cylindrical cross sections. The conduits for the helium are formed by the contact surfaces of the Styropor and the concrete, because the detection cavities 2 themselves have a solid Styropor cross section.

The cooling gas potentially entering the insulating concrete is conducted out from the area of the insulating concrete along said contact surfaces.

This system of detection cavities arranged within the insulating concrete naturally may also serve to dry the insulating concrete during the building and thermal stabilization phases, respectively. It is further possible to eliminate the Styropor present in the channels by means of chemical conversion so that clear concrete channels are obtained.

The detection installation shown in FIGS. 7 and 8 may obviously also be used in a reactor pressure vessel with a single wall liner. This is demonstrated in particular in FIG. 9. This drawing shows a section through a single wall liner, to which a concrete layer 11 is joined on the outside. Tubular detection cavities 2 are cast into this concrete layer 11. The walls of these tubes consist of Styropor. The detection cavities 2 are preferably hollow on the inside. It is possible, however, to use Styropor tubes with a solid profile. The detection cavities 2 within the concrete layer 11 are arranged in the form of a grid and penetrate the concrete layer in orthogonal directions over its entire area. Such a detection installation is used preferably in reinforced reactor pressure vessels with their supporting concrete structure extending to the liner.

The specification and drawings set forth preferred embodiments of the invention. It should be noted, however, that the invention is not limited to those specific embodiments and methods specifically disclosed, but extends instead to all embodiments substitute and equivalent constructions falling within the scope of the invention as defined by the claims.

What is claimed is:

1. A leak detection device for the pressure vessel of a gas cooled nuclear reactor having a cooling gas circuit, a pressure vessel cavity and a single- or double-walled pressure vessel cavity liner comprising:
    a detection cavity in the pressure vessel immediately adjacent the pressure vessel cavity liner and in an area of potential leakage of cooling gases;
    a flexible foam disposed in said detection cavity and adhesively secured to the pressure vessel;
    a gas collector arranged in the cooling gas circuit of the reactor, and
    a gas tight connecting conduit connecting said detection cavity with said gas collector.

2. The leak detection device of claim 1 wherein said flexible foam is foamed Styropor.

3. The leak detection device of claim 1 wherein said detection cavity is designed in the form of a channel.

4. The leak detection device of claim 1 wherein the length of said flexible foam is adaptable to the length of the weak locations of said liner and said cooling conduit.

5. The leak detection device of claim 1 wherein said flexible form is adhesively secured by a bonding intermediate comprising a one or two-component adhesive and wherein said detection cavity is adhesively bonded to said liner or to a reactor cooling circuit conduit.

6. The leak detection device of claim 5 wherein said detection cavity is open on its side facing the weak locations of said liner or said cooling circuit conduit.

7. The leak detection device of claim 1 wherein said detection cavity is of a trapezoidal or triangular cross-section having an internal void.

8. The leak detection device of claim 7 wherein said gas-tight connecting conduit is extended through one of the bounding surfaces of said detection cavity to said inner void.

9. The leak detection device of claim 2 wherein two lateral walls of said detection cavity are formed by said liner and the third lateral wall by a flat piece of Styropor.

10. The leak detection device of claim 1 wherein said gas-tight connecting conduit is in direct contact through said flexible form with said liner.

11. The leak detection device of claim 1 wherein said detection cavity is of a cylindrical cross-section.

12. The leak detection device of claim 11 wherein said detection cavity is provided with a cylindrical inner void.

13. A leak detection system for a gas cooled high temperature nuclear power plant comprising:
    a concrete pressure vessel;
    a plurality of pressure vessel cavities in said pressure vessel for housing a reactor core, at least one gas driven turbine and a reactor cooling circuit having at least one gas collection device;
    a metal liner for each of said pressure vessel cavities comprising a plurality of metal plates welded together;
    a plurality of detection cavities formed in said concrete pressure vessel adjacent the welded areas of said liners;
    flexible foam, of sufficient strength to remain self-supporting and intact under the operating pressures and conditions of said nuclear power plant and being adhesively secured in said detection cavities;
    a plurality of gas detection connector conduits connecting said detection cavities with said gas collection devices;
    means for applying reduced pressure to said gas collection device said connector conduits and said detection cavities;
    means for measuring the gas content in predetermined isolated detection cavities in cooperation with said means for applying reduced pressure.

14. The leak detection system of claim 13 wherein said means for measuring the gas content in said detection cavities is a helium gas measuring and display device.

15. The leak detection system of claim 13 wherein said means for applying reduced pressure is a vacuum device.

16. The leak detection system of claim 13 wherein said liners are single walled liners.

17. The leak detection system of claim 13 wherein said liners are double walled liners.

* * * * *